US010677659B2

(12) United States Patent
Gordon et al.

(10) Patent No.: US 10,677,659 B2
(45) Date of Patent: Jun. 9, 2020

(54) SUPERCONDUCTING SWITCH THERMOMETER ARRAY

(71) Applicant: INTERNATIONAL BUSINESS MACHINES CORPORATION, Armonk, NY (US)

(72) Inventors: Ryan T. Gordon, Yorktown Heights, NY (US); Michael S. Gordon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/825,605

(22) Filed: Nov. 29, 2017

(65) Prior Publication Data

US 2019/0162602 A1    May 30, 2019

(51) Int. Cl.
*G01K 7/00* (2006.01)
*G01K 1/00* (2006.01)
(Continued)

(52) U.S. Cl.
CPC ............. *G01K 7/006* (2013.01); *G01K 7/36* (2013.01); *H01H 36/00* (2013.01); *G01K 1/026* (2013.01); *G01K 2203/00* (2013.01)

(58) Field of Classification Search
USPC .......................... 374/166, 141, 163, 176, 208
See application file for complete search history.

(56) References Cited

U.S. PATENT DOCUMENTS 6,320,369 B1    11/2001    Hidaka et al.
6,446,444 B1     9/2002    Chase et al.
(Continued)

FOREIGN PATENT DOCUMENTS

CN     202794074 U    3/2013
JP      01189528 A    7/1989
(Continued)

OTHER PUBLICATIONS

Supracon, "Superconducting switch", http://www.supracon.com/en/superconducting_switch.html, accessed on Oct. 5, 2017, pp. 1-2.
(Continued)

*Primary Examiner* — Mirellys Jagan
(74) *Attorney, Agent, or Firm* — L. Jeffrey Kelly

(57) ABSTRACT

A method and a structure for a low temperature thermometer is provided. The present invention may include a method of determining an ambient temperature is below a transition temperature, the method including measuring a magnetic field of a magnetic field source, where a superconducting film is positioned between a magnetic field sensor and the magnetic field source, where the superconducting film has the transition temperature, $T_c$, based on determining the measured magnetic field approximately equals an expected magnetic field of the magnetic field source, outputting a first state of a switch, wherein the first state of the switch indicates the ambient temperature is above the $T_c$, based on determining the measured magnetic field is less than the expected magnetic field, outputting a second state of the switch, where the second state of the switch indicates the ambient temperature is below the $T_c$.

14 Claims, 7 Drawing Sheets

(51) Int. Cl.
*H01H 36/00* (2006.01)
*G01K 7/36* (2006.01)
*G01K 1/02* (2006.01)

(56) References Cited

U.S. PATENT DOCUMENTS

| | | | |
|---|---|---|---|
| 6,768,300 | B2 | 7/2004 | Shirakawa et al. |
| 7,268,563 | B2 | 9/2007 | Hariharan et al. |
| 7,567,156 | B2 | 7/2009 | Westphal et al. |
| 2013/0221958 | A1* | 8/2013 | Islam ................ G01R 33/0047 324/224 |
| 2015/0369885 | A1* | 12/2015 | Ito ..................... G01R 33/3815 505/162 |

FOREIGN PATENT DOCUMENTS

| | | |
|---|---|---|
| JP | 01276526 A | 11/1989 |
| JP | 02312124 A | 12/1990 |

OTHER PUBLICATIONS

Wikipedia, "Cryotron", https://en.wikipedia.org/w/index.php?title=Cryotron&oldid=783628178, accessed on Oct. 5, 2017, pp. 1-2.

phys.org, "Physicists develop ultrathin superconducting film", https://phys.org/news/2017-04-physicists-ultrathin-superconducting.html, Apr. 6, 207, pp. 1-4.

Chang et al., "Direct observation of competition between superconductivity and charge density wave order in YBa2Cu3O6.67", www.nature.com/naturephysics,Nature Physics, vol. 8, Dec. 2012, pp. 871-876.

Trezza et al., "Superconducting properties of Nb thin films deposited on porous silicon templates", Journal of Applied Physics, vol. 104, Issue 8, Oct. 15, 2008, http://aip.scitation.org/doi/10.1063/1.3006014, Published by the American Institute of Physics, pp. 1-8.

Song et al., "Schematic drawing of the NIST dilution refrigerator system", Published in Invited Review Article: A 10 mK scanning probe microscopy facility, Scientific Figure, The Review of Scientific Instruments, Dec. 2010, https://www.researchgate.net/49720996_fig14_Schematic-drawing-of-the-NIST-dilution-refrigerator-system-There-are-five-heat, 1 page.

Howald et al., "Evidence for Coexistence of Bulk Superconductivity and Itinerant Antiferromagnetism in the Heavy Fermion System CeCo(In1-xCdx)5", Scientific Reports, www.nature.com/scientificreports, vol. 5, Article No. 12528, Published online: Jul. 30, 2015, pp. 1-15.

\* cited by examiner

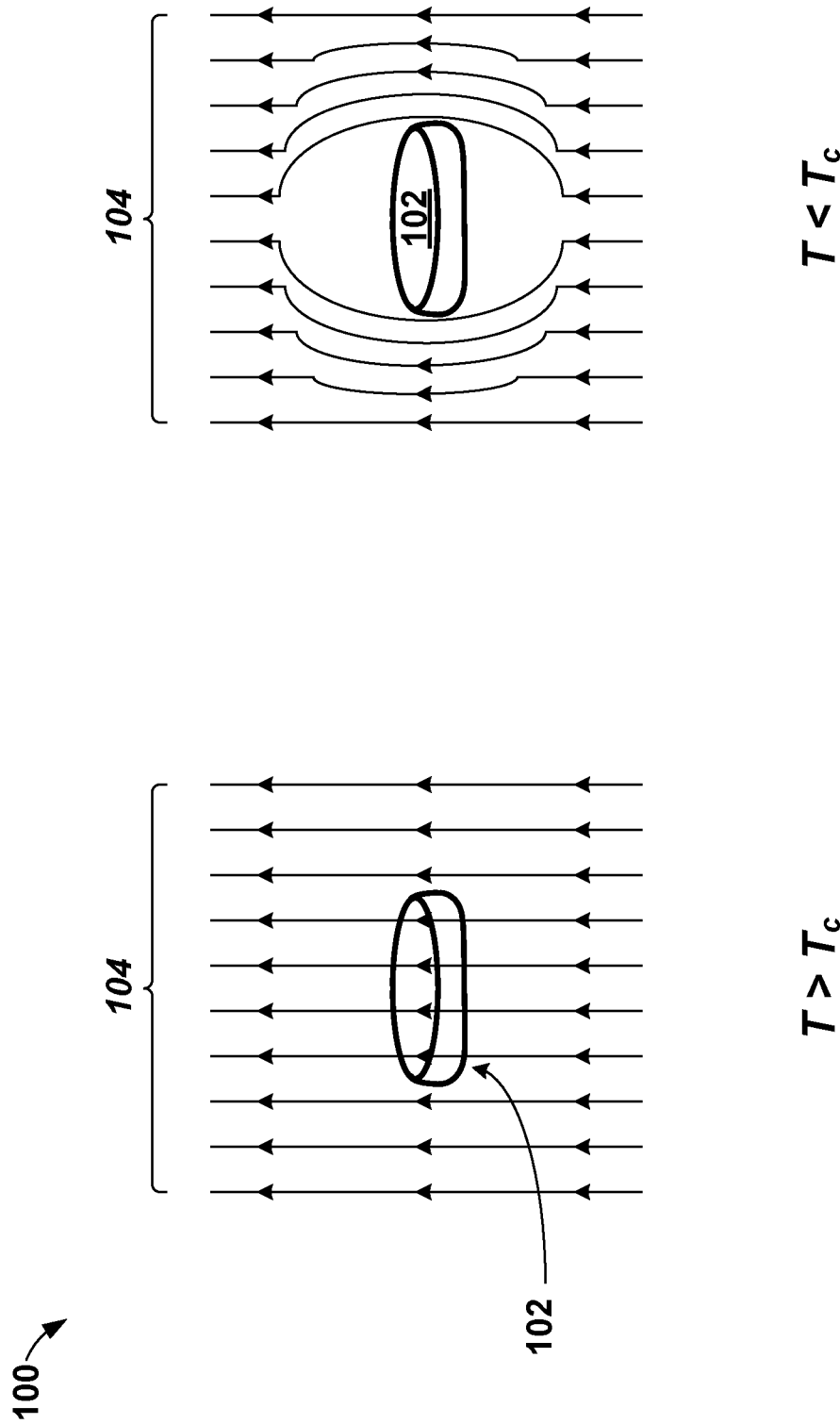

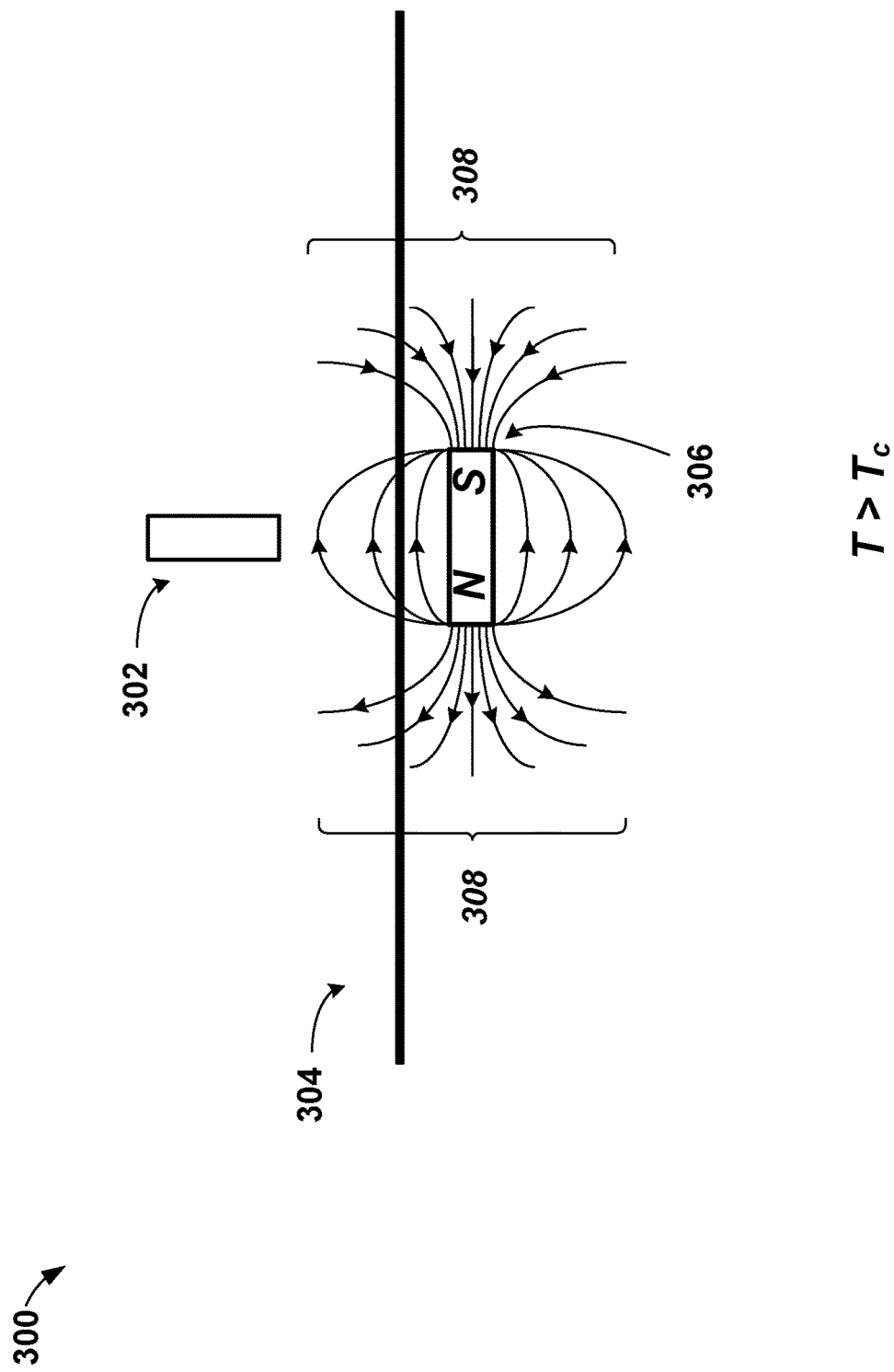

SUPERCONDUCTING SWITCH THERMOMETER ARRAY

BACKGROUND

The present invention relates, generally, to the field of cryogenics, and more particularly to low temperature thermometers.

Cryogenics is the science of producing and studying the effects of low temperature conditions. Cryogenic conditions are generally below about 173 Kelvin (K). Low-temperature experimental measurements have been essential in forming our understanding of quantum phases of matter, such as superconductivity, and magnetism. With the increased use of closed-cycle refrigeration technology, making low-temperature physics experiments more accessible to today's researchers, and the expensive cost of obtaining reliable temperature sensors that are calibrated over a reasonable temperature range, new methods of reading temperature in cryostats which are cost effective would be beneficial.

SUMMARY

According to an embodiment, a method and a structure for a low temperature thermometer is provided. The present invention may include a method of determining an ambient temperature is below a superconducting transition temperature, the method including measuring a magnetic field of a magnetic field source, where a superconducting film is positioned between a magnetic field sensor and the magnetic field source, where the superconducting film comprises a transition temperature, $T_c$, based on determining the measured magnetic field approximately equals an expected magnetic field of the magnetic field source, outputting a first state of a switch, wherein the first state of the switch indicates the ambient temperature is above the $T_c$, based on determining the measured magnetic field is less than the expected magnetic field, outputting a second state of the switch, where the second state of the switch indicates the ambient temperature is below the $T_c$.

According to an embodiment, a method of determining an ambient temperature is above or below a transition temperature, the method including measuring a magnetic field of a magnetic field source, where a superconducting film is positioned between the magnetic field sensor and the magnetic field source, where the superconducting film comprises a transition temperature, $T_c$, based on determining the measured magnetic field is less than the expected magnetic field of the magnetic field source, outputting a second state of a switch, where the second state of the switch indicates the ambient temperature is below the $T_c$.

According to an embodiment, a switch for a low temperature thermometer is provided. The switch includes a magnetic field sensor, where the magnetic field sensor measures a magnetic field, a magnetic field source, and a superconducting film comprising a transition temperature, $T_c$, positioned between the magnetic field sensor and the magnetic field source, where the switch outputs a first state based on the magnetic field sensor measuring the magnetic field approximately equal to an expected magnetic field from the magnetic field source, where the first state indicates an ambient temperature above the $T_c$, where the switch outputs a second state based on the magnetic field sensor measuring the magnetic field weaker than the expected magnetic field from the magnetic field source, where the second state indicates the ambient temperature below the $T_c$.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates a superconducting disk, according to an embodiment;

FIG. 2 illustrates a superconducting disk, according to an embodiment;

FIG. 3 illustrates a switch, according to an embodiment;

DETAILED DESCRIPTION

Figure 4:
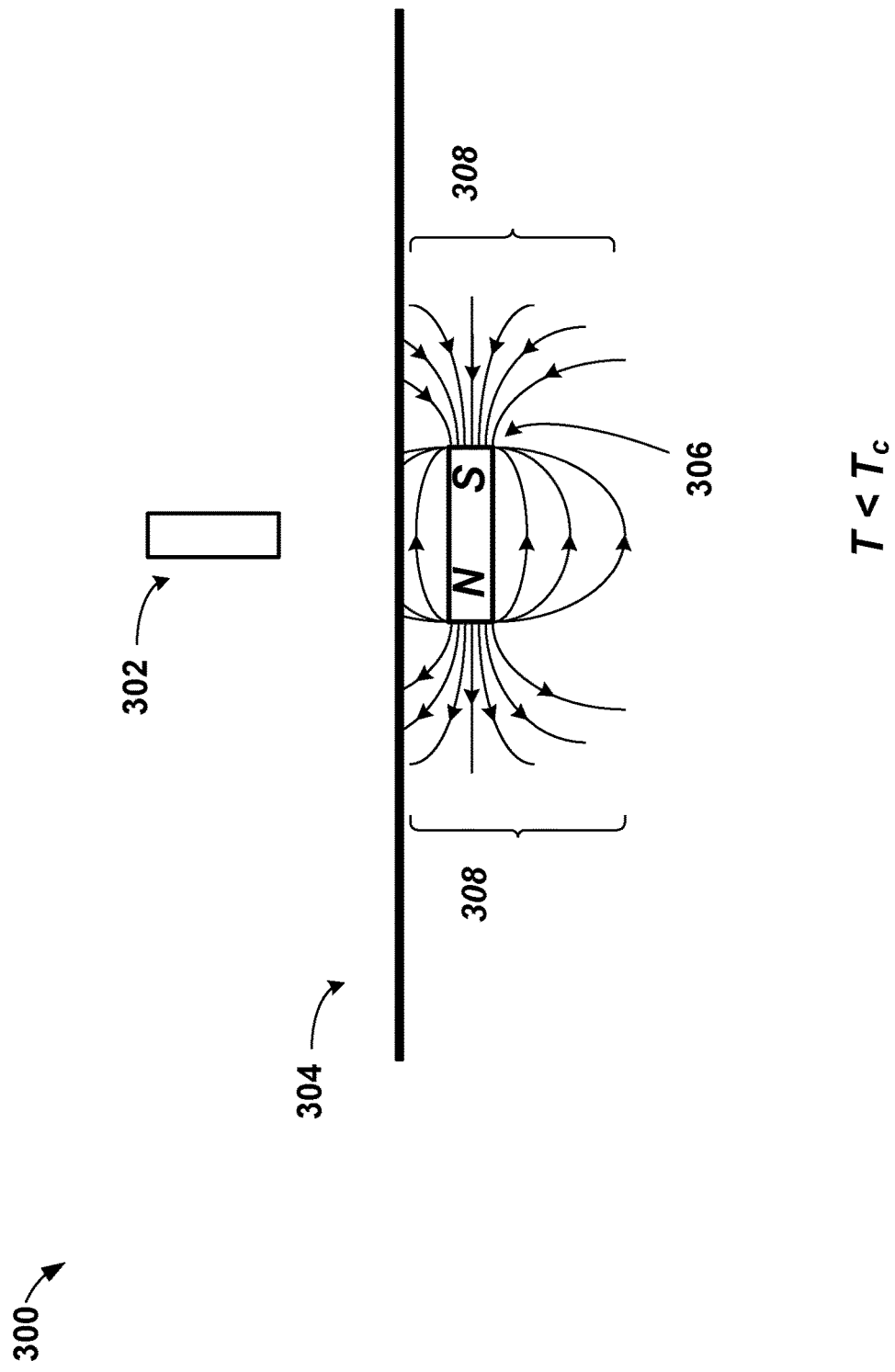
FIG. 4 illustrates a switch, according to an embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances, may have not been described in detail. In other instances, some processing steps or operations that are known in the art may not be described at all. It should be understood that the following description is rather focused on the distinctive features or elements of various embodiments of the present invention.

Embodiments of the present invention relate to the field of cryogenics, and more particularly to low temperature thermometers. The following described exemplary embodiments provide a method, and a structure for, among other things, a low temperature thermometer made using a superconducting switch with a known transition temperature to determine whether an ambient temperature is above or below the superconducting transition temperature of the superconducting film used in the thermometer. The ambient temperature is a temperature surrounding the superconducting switch. Therefore, the present embodiment has the capacity to improve the technical field of cryogenics and other fields that use cryogenics, such as condensed matter physics, quantum information science (quantum computing), etc. An advantage of the invention includes cost savings in the magnitude of one tenth of the cost of currently used low temperature thermometers.

As previously described, due to the increased use of closed-cycle refrigeration technology, and the expensive cost of obtaining reliable temperature sensors that can be calibrated over a reasonable temperature range, new methods of reading temperature in cryostats which are cost effective would be beneficial.

Low-temperature experimental measurements have been essential in forming our understanding of quantum phases of matter, such as superconductivity, and magnetism. Materials exhibiting these phases can often have far reaching technological applications, ranging from superconducting MRI magnets, sensitive amplifiers, and the most sensitive magnetic field detectors available. Basic research in low-temperature physics is one of the largest areas of condensed matter physics, and experimental equipment continues to evolve. Recent advances in refrigeration technology have made possible closed-cycle helium refrigerators or dilution refrigerators, which do not require external liquid helium or liquid nitrogen to sustain their operation, significantly reducing the cost of performing low temperature experiments and making them more accessible to researchers all over the world. Vital to the field of low-temperature experimental physics is the ability to control and read temperature over a wide range, from room temperature down to a few milli-Kelvin. Many state-of-the-art thermometers used for these experiments are essentially resistors or diodes, whose physical properties of resistance or current-voltage characteristics vary predictably over a wide temperature range. Because the physical properties of these sensors differ slightly from one sensor to the next, each thermometer must be calibrated independently for accurate temperature readings. Calibrating these thermometers is costly and involves cooling the sensor by a trained professional in a cryostat over the desired temperature calibration range. As an example, ruthenium oxide thermometers are widely used in dilution refrigerators for reading temperature in the milli-Kelvin to ~100 Kelvin range and when calibrated can cost more than a few thousand United States dollars. Cernox™ resistive thermometers (Cernox™ is a registered trademark of Lake Shore Cryotronics, Inc.), are commonly used in low-temperature cryostats and have a similar price range for a calibrated sensor.

According to an embodiment, a system is disclosed that comprises an array of switches to monitor the cryogenic temperature at various points in a device, for example, a cryostat, where each switch works on a fundamentally new mechanism for monitoring temperature. These switches each consist of three basic components: a superconducting film of known composition, a magnetic field source (permanent magnet or current-carrying wire), and a magnetic field sensor. In the switch configuration, the superconducting film is positioned between the magnetic field source and the magnetic field sensor. In its normal electronic state, the superconducting film allows the magnetic field lines from the source to pass through to the magnetic field sensor, with little deviation from the magnetic field line pattern. In the superconducting film's superconducting state, however, the superconducting film screens the magnetic field from the interior of the film and hence dramatically alters the magnetic field profile at the location of the magnetic field sensor. This change in the component of the magnetic field is used to trigger an output signal from the switch.

Due to advances in the ability to fabricate superconducting materials as films, the transition temperature can be adjusted over a wide range of values, allowing for an array of these switches, each with a different transition temperature, to be implemented into an environment to measure the temperature at various locations. This switch array is a fundamentally new way to implement superconducting technology into a temperature monitoring system, particularly in low-temperature experiments and is a more cost effective option when compared to standard calibrated temperature sensors.

Here, such a method is described, which uses the behavior of superconducting films, or alternatively may use conventional superconducting materials, in applied magnetic fields. High quality superconducting films can be grown in large quantities with well defined transition temperatures. By taking advantage of the ability to adjust the transition temperature in a superconductor from just above absolute zero to nearly 138 Kelvin, an array of these sensors can be used to replace costly calibrated sensors for low-temperature experimentation.

This invention relies on basic physical principles of superconductivity. First discovered in 1911, the superconducting state in matter exhibits two fundamental properties, the loss of electrical resistance and the expulsion of externally applied magnetic fields from the material. This second property, the Meissner effect, involves swirling charge currents from paired superconducting electrons to screen out externally applied magnetic fields from deep within the interior of the superconducting material. While there are many families of superconducting materials that can show drastically different properties, all superconductors show the basic properties of loss of resistance and screening of external magnetic fields below the transition temperature.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Referring to FIGS. 1 and 2, a superconductor disk 102 is shown, according to an embodiment. FIG. 1 illustrates the superconductor disk 102 in an applied magnetic field with an ambient temperature T above a superconducting critical temperature, or above a transition temperature, $T_c$, as shown, $T>T_c$. The transition temperature is the temperature where above this temperature the superconductor disk 102 is in a non-superconducting state, and magnetic field lines 104 pass through the superconductor disk 102 without deflection. The superconductor disk 102 may include niobium titanium, lead, mercury, ceramics, germanium, niobium, carbon nanotubes, or any other superconducting material. The $T_c$ is dependent on the material of the superconductor disk 102. In an embodiment, the $T_c$, may be between about 0.01 and 130 Kelvin, or between 1 and 130 K.

FIG. 2 illustrates the superconductor disk 102 in an environment where the ambient temperature T is below the transition temperature, $T_c$, as shown, $T<T_c$. The superconductor disk 102 is placed in an applied magnetic field with its temperature below the superconducting critical temperature. Below the transition temperature, the superconductor disk is in a superconducting state, and the magnetic field lines 104 are screened by supercurrents. The superconductor disk 102 has cancelled interior magnetic fields and has a loss of electrical resistance. The state where magnetic field lines are screened from the bulk of the superconductor is known as the Meissner effect, as previously stated.

Referring to FIGS. 3 and 4, a switch 300 is shown, according to an embodiment. The switch 300 may include a superconducting film 304 positioned between a magnetic field source 306 and a magnetic field sensor 302. In an embodiment, the magnetic field source 306 may be a permanent magnet, which maintains magnetic properties in an absence of an inducing field or an electrical current. In an alternate embodiment, the magnetic field source 306 may be a current-carrying wire, which behaves as a magnet while an electrical current passes through it. The magnetic field source 306 may have magnetic field lines 308 surrounding the magnetic field source 306, and are shown as flowing from the North Pole to the South Pole of the magnetic field source 306. The superconducting film 304 may be thin and flexible and may have more than one layer. The superconducting film 304 may include niobium titanium, lead, mercury, ceramics, germanium, niobium, carbon nanotubes, or any other superconducting material. The superconducting film 304 may have superconducting properties below a transition temperature, $T_c$, such as zero electrical resistance and conduct an electrical current without loss. The superconducting film 304 may range in thickness from a few nanometers to several hundreds of micrometers. In an embodiment, the superconducting film 304 may be deposited on the magnetic field source 306. The magnetic field sensor 302 may measure a vector component of a magnetic field. The vector component of a magnetic field includes a direction and a strength of the magnetic field. In an embodiment, the magnetic field sensor 302 may include a Hall effect sensor.

The magnetic field source 306 may be physically separated from the magnetic field sensor 302 by the superconducting film 304. The superconducting film 304 may be manufactured for a specific $T_c$, such that the magnetic field sensor 302 can identify whether the switch 300 is in an environment where a temperature is above or below the $T_c$, due to changes in the magnetic field lines 308, and may be used to trigger the switch 300 to change from a first state to a second state. In an embodiment, the first state may indicate the switch 300 is in an ambient temperature, T, above the $T_c$, and the second state may indicate the switch 300 is in an ambient temperature, T, below the $T_c$.

As shown in FIG. 3, when $T>T_c$, the magnetic field lines 308 may pass through the superconducting film 304 essentially unchanged, as if the superconducting film 304 were not present, from the magnetic field source 306 to the magnetic field sensor 302. In this embodiment, the switch 300 may indicate the first state.

As shown in FIG. 4, when $T<T_c$, the magnetic field lines 308 may be deflected by the superconducting film 304 and the magnetic field sensor 302 may sense the change of the magnetic field lines 308 and may trigger the switch 300 to the second state. The first state output of the switch 300 may depend on the magnetic field sensor 302 measuring a first magnetic field which is approximately equal to an expected magnetic field. The expected magnetic field is the magnetic field expected to be measured from the magnetic field source 306, indicating the superconducting film 304 is not in a superconducting state, and an ambient temperature is above the $T_c$. The second state output of the switch 300 may depend on the magnetic field sensor 302 measuring a second magnetic field which is less than the expected magnetic field, or measuring no magnetic field. This indicates the superconducting film 304 is in the superconducting state and is blocking the magnetic field lines 308, and the ambient temperature is below the $T_c$.

The switch 300 may change states and switching may occur when the superconducting film 304 is below its superconducting transition temperature, $T_c$. By taking advantage of the Meissner effect, the screening properties of blocking a magnetic field of the superconducting film 304 differ considerably across the superconducting transition temperature, leading to a large change in the magnetic field lines 308 at the position of the magnetic field sensor 302. The change in the magnetic field lines 308 from the magnetic field source 306 as measured on the other side of the superconducting film 304 is measured by the magnetic field sensor 302 and can be used to trigger the switch 300.

Upon passing into the superconducting state, below $T_c$, the superconducting film 304 screens the magnetic field lines 308, causing a reduction in magnetic field strength at the position of the magnetic field sensor 302 and leading to an output of the magnetic field sensor 302 which signals that a ambient temperature has passed below $T_c$.

In an embodiment, an array of switches 300 may be used in different locations in a system, for example a cryostat, where it is desirable to monitor the temperature at various locations. Additionally, each of the switches 300 of the array of switches 300 may switch at a different temperature, by using a superconducting film 304 with a different superconducting transition temperature, $T_c$. Several families of superconductors have transition temperatures which can be adjusted by adjusting a chemical composition of the compound. One such family of superconductors is high $T_c$ cuprates. An example is shown in FIG. 5.

Figure 5:
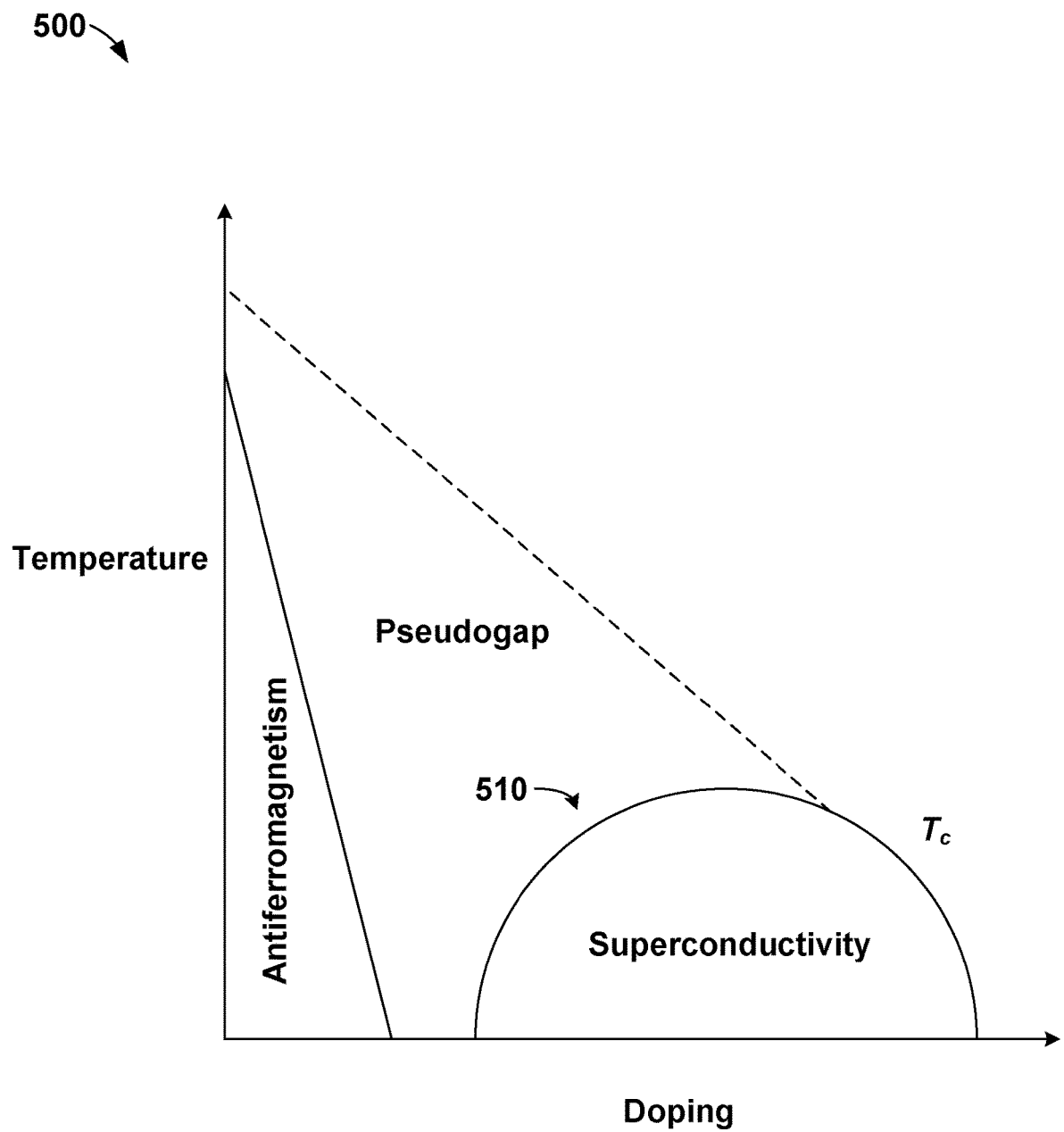
FIG. 5 illustrates a generic temperature-doping phase diagram, according to an embodiment.

Referring to FIG. 5, a temperature-doping phase diagram 500 for a generic superconductor is shown, according to an embodiment. The temperature-doping phase diagram 500 has an increase in doping along the horizontal or x-axis, and an increase in temperature in Kelvin along the vertical or y-axis. The temperature-doping phase diagram 500 shown is for a high $T_c$ cuprate superconductor, where the transition temperature, $T_c$, may be as high as 138 Kelvin by adjusting a doping or an oxygen content in the chemical composition to alter the conduction properties in the copper-oxide planes. A high $T_c$ cuprate contains anionic copper complexes such as, for example $YBa_2Cu_3O_7$. The temperature-doping phase diagram 500 illustrates three states of the high $T_c$ cuprate superconductor, a state of antiferromagnetism, a state of superconductivity and a pseudogap state between the state of antiferromagnetism and the state of superconductivity.

In an embodiment, doping is achieved by adjusting the oxygen content in the compound, which takes the material from being antiferromagnetic in its parent or undoped state through a superconducting phase with a $T_c$ as high as 138 Kelvin at the peak of a superconducting dome 510 in the temperature-doping phase diagram 500. The compound can be adjusted such that the compound has a desired $T_c$ and it can be determined an ambient temperature surrounding the compound is above or below the $T_c$ by determining which state the compound is in, or by determining if the compound is in a superconducting state. For example, if the $T_c$ is 100 K for the compound, and a switch 300 determines that the compound is in the superconducting state, then the ambient temperature is below 100 K. If the switch 300 determines the compound is not in the supercomputing state, then the ambient temperature is above 100 K.

A state of antiferromagnetism is along a lower doping level and decreases a doping level as the temperature increases. Stated differently, the temperature of magnetic ordering decreases as doping is increased. A state of superconductivity is at a higher doping level than the state of antiferromagnetism and as the doping level increases, for an increasing temperature, there is a state of superconductivity with an increasing temperature. State differently, as the doping level completely suppresses the antiferromagnetism, superconductivity emerges with an increasing $T_c$ value, up to the maximum of the superconducting dome 510. As the doping level increases further, the $T_c$ value decreases until superconductivity disappears completely for sufficiently high doping level.

Figure 6:
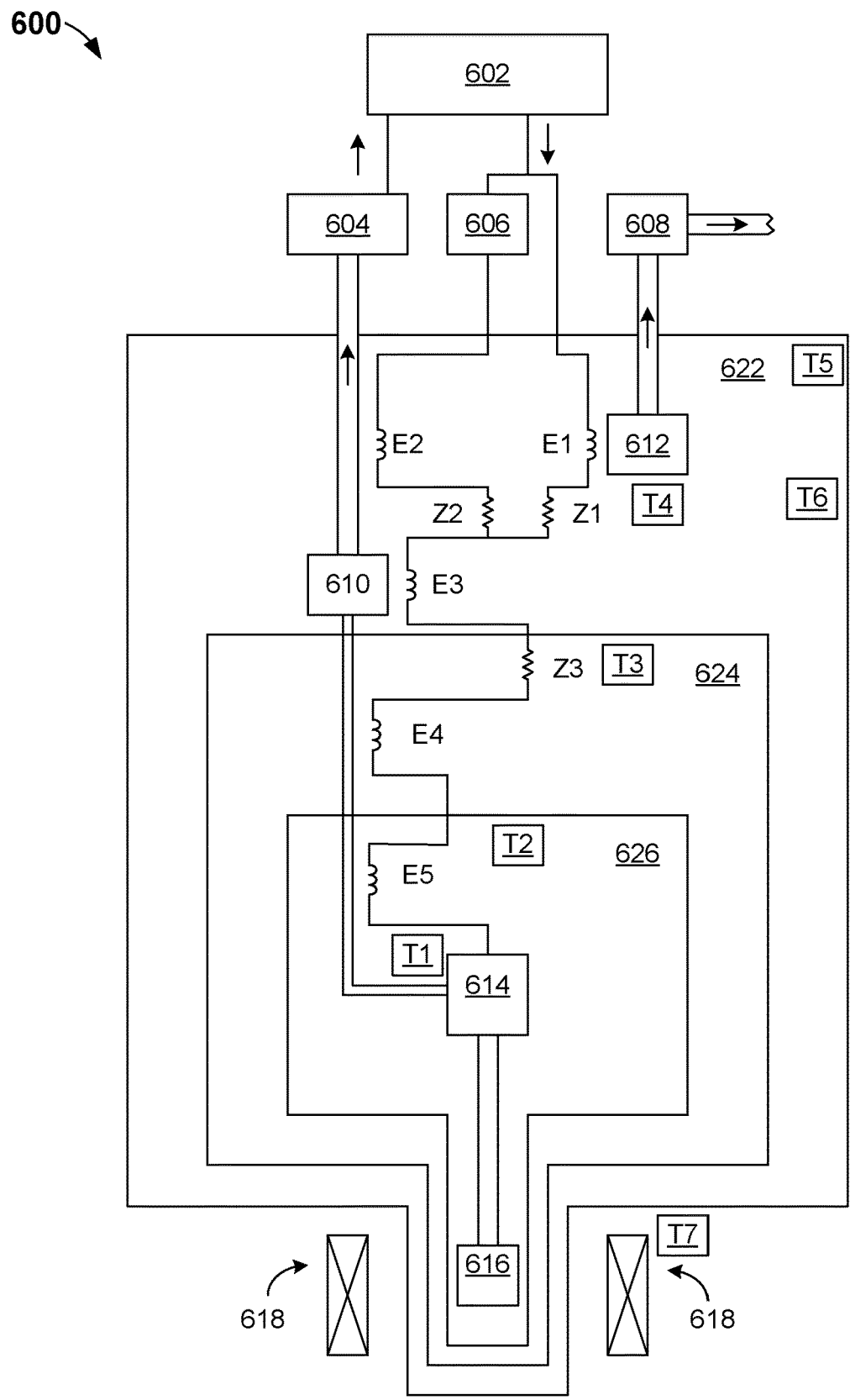
FIG. 6 illustrates a dilution refrigerator, according to an embodiment.

Referring to FIG. 6, a dilution refrigerator 600 is shown, according to an embodiment. The dilution refrigerator 600 is a type of cryogenic device or refrigerator which provides continuous cooling to temperatures as low as 10 milliKelvin (mK) or slightly lower. The dilution refrigerator 600 may have one or more embedded chambers for multiple cooling stages, with each inner chamber operating at a lower temperature than a surrounding chamber and acting as a black-body radiation shield. The dilution refrigerator 600 may have a first chamber 622, a second chamber 624 within the first chamber 622, and a third chamber 626 within the second chamber 624. The first chamber 622 may be an inner vacuum chamber (IVC). The second chamber 624 may be a still shield. The third chamber 626 may include a mixing chamber shield. The dilution refrigerator 600 may be controlled by a helium-3 and helium-4 gas handling system 602, a helium-3 pumping station 604, a compressor 606, and a pump 608. The pump 608 may control a vapor pressure of liquid helium-4 in a 1K pot 612 inside the first chamber 622. The helium-3 pumping station 604 may liquefy helium-3 gas and remove heat of condensation. The compressor 606 may pump helium-3 through a first heat exchanger E1, a first line impedance Z1, a second heat exchanger E2, a second line impedance Z2, and a third heat exchanger E3, in the first chamber 622. The compressor 606 may pump helium-3 through a third line impedance Z3, and a fourth heat exchanger E4 in the second chamber 624. The compressor 606 may pump helium-3 through a fifth heat exchanger E5, and a mixing chamber 614 in the third chamber 626. The helium-3 pumping station 604 may control helium-3 in a still 610 in the first chamber 622. The still 610 may control helium-3 in the mixing chamber 614. The mixing chamber 614 may control an ambient temperature in the third chamber 626 and at a test area 616. The test area 616 may include cryogenic equipment for a cryogenic experiment. In an embodiment the test area 616 may include a scanning tunneling microscope. There may be a magnet 618 surrounding the outside of the dilution refrigerator 600, for use in controlling the test area 616.

In an embodiment, FIG. 6 has seven locations identified in the dilution refrigerator 600 to indicate useful positions for placement of seven switch thermometers 300, as described above, during an experiment. The seven switch thermometers 300 include switch thermometer T1, switch thermometer T2, switch thermometer T3, switch thermometer T4, switch thermometer T5, switch thermometer T6, and switch thermometer T7. The switch thermometers T1-T7 may each be set to a different $T_c$ to identify if a temperature at a location of each switch thermometer T1-T7 is above or below the $T_c$ of the corresponding switch thermometer. The switch thermometers T1-T7 can each be made using a film with a different superconducting transition temperature, $T_c$, such that the switch thermometers T1-T7 will each switch at a desired temperature for a specific location in the dilution refrigerator 600. An output signal sent from each of the switch thermometers T1-T7 may be routed to a display to monitor the temperature at each of the seven locations during a low-temperature experiment, allowing better resolution of a temperature of different locations within the dilution refrigerator 600. Information about the temperature distribution throughout the dilution refrigerator 600, may aid in diagnosis of a problem, for example if the dilution refrigerator 600 is not operating properly. Being able to monitor the temperature at so many locations would be a valuable system for monitoring the general cooling of any cryogenic system as well. Typically, only one or two thermometers are used inside of the dilution refrigerator 600 due to the cost associated with using calibrated temperature sensors. The superconducting switch thermometer array using the switch thermometers T1-T7 offers a new method for monitoring temperature throughout a system, especially useful in low-temperature experiments, which is more cost effective than current conventional means.

The superconducting film 304 of the switch 300 may include $CeCoIn_5$, $YBa_2Cu_3O_7$, or any other such family of superconducting material where the superconducting transition temperature can be adjusted by altering some physical parameter, such as doping, pressure, etc. Two examples of superconducting materials and a corresponding $T_c$ which can be used for each of the switch thermometers T1-T7 to enable this invention at the locations shown in the cryostat, are further illustrated in FIGS. 6 and 7.

In an embodiment, an array of switch thermometers 300 may be packaged together and located at a single location within the cryogenic experiment, with each switch thermometer 300 including a different $T_c$. In an embodiment, the $T_c$ for each switch thermometer 300 of the array of switch thermometers 300 may range from a low temperature of about 5-10 mK to a high temperature of about 150 K. The array of switch thermometers 300 may allow monitoring of a temperature at the single location as it passes through many different temperatures, defined by the $T_c$ of each different superconducting film for each switch thermometer 300 in the array of switch thermometers 300. In a further embodiment, multiple arrays, each with an ability to detect numerous temperature changes may be placed throughout the cryogenic experiment to increase resolution to monitor temperature in the cryogenic experiment. In an example, the single location may have the array of switch thermometers 300 with $T_c$ values close together, where it is desirable to detect small changes in temperature, for example at the mixing chamber 614 of the dilution refrigerator 600.

Figure 7:
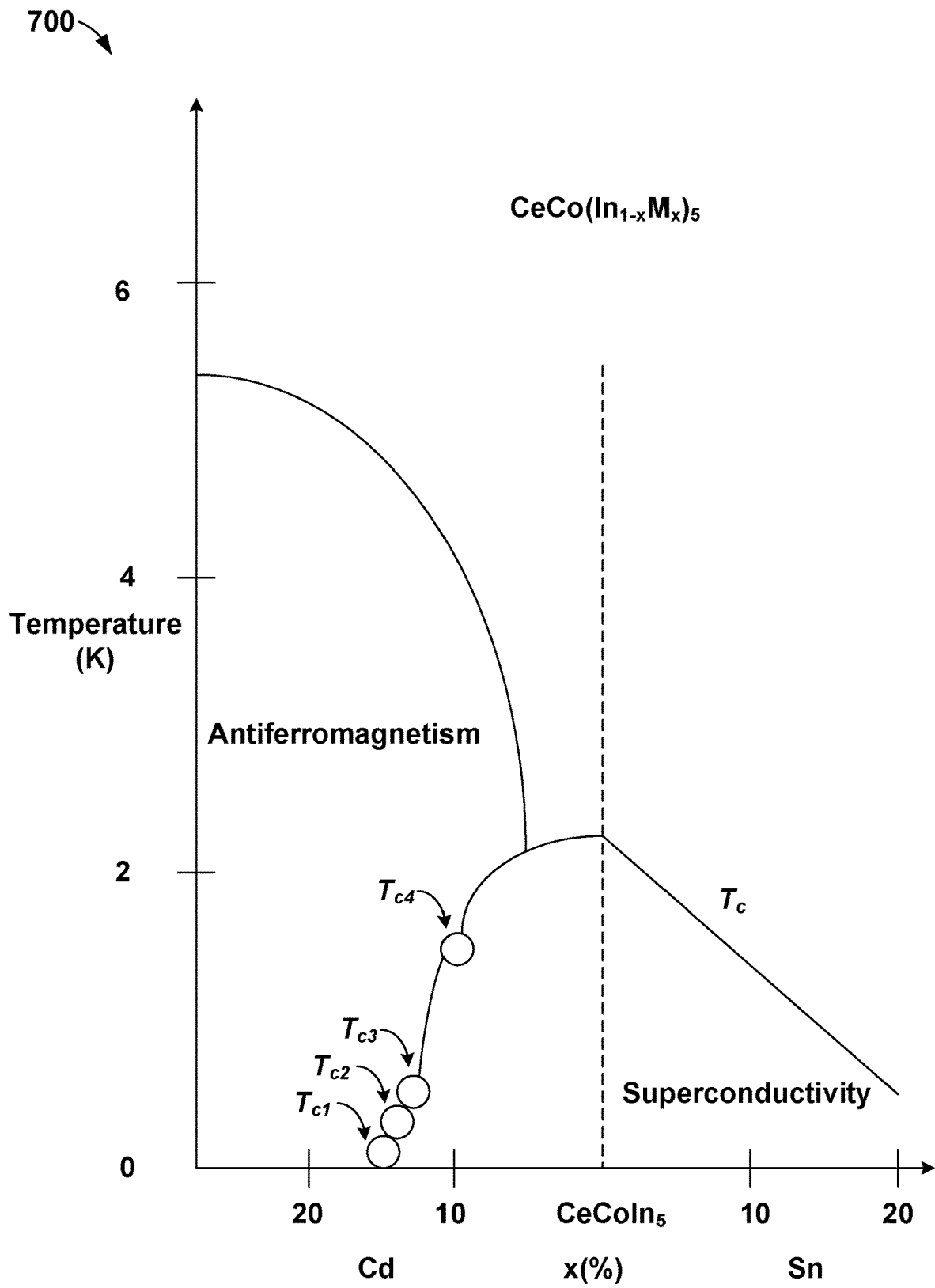
FIG. 7 illustrates a temperature-doping phase diagram for $CeCo(In_{1-x}M_x)_5$, where M is a transition metal substitution, according to an embodiment.

Referring to FIG. 7, a temperature-doping phase diagram 700 for $CeCo(In_{1-x}M_x)_5$ is shown, where M is a transition metal substitution, according to an embodiment. Cerium cobalt indium 5 ($CeCoIn_5$) is a superconductor whose superconducting transition temperature may be adjusted through a range of values from just above absolute zero to slightly above 2 K by substitution of a variety of transition metal atoms, M, for indium, In, as shown in FIG. 7.

The temperature-doping phase diagram 700 for $CeCo(In_{1-x} M_x)_5$ has a doping percent shown as x (%) along the horizontal or x-axis, and shows decreasing doping percent of cadmium, Cd, from about 30% to 0% at a line which divides the x-axis at a point of 0% doping. To the right of the dividing line on the x-axis is an increasing doping percent of tin, Sn, increasing from 0% to about 30% doping. An increase in temperature in Kelvin is shown along the vertical or y-axis. The temperature-doping phase diagram 700 for $CeCo(In_{1-x}M_x)_5$ illustrates a change in $T_c$ as a doping percent and chemical composition change.

Two states are shown, a state of antiferromagnetism is along a higher doping level of Cd and a transition temperature of antiferromagnetism decreases as the doping level of Cd increases. Stated differently, a state of antiferromagnetism is along a higher doping level of Cd, where magnetic ordering temperature increases for increasing Cd doping level. A state of superconductivity exists at a lower doping level of Cd, with the $T_c$ increasing with temperature, and then with an increasing doping level of Sn, a state of superconductivity decreases with temperature. Superconductivity has its maximum transition temperature for the parent compound, with zero doping, and is weakened by doping away in either direction by doping with either Cd or Sn.

The temperature-doping phase diagram 700 for $CeCo(In_{1-x}M_x)_5$ illustrate a first transition temperature $T_{c1}$ of approximately 0.05 K, identifying a Cd doping level of approximately 15%, can be used for the switch thermometer T1 as shown in the dilation refrigerator 600. The switch thermometer T1 is shown at the mixing chamber 614. A second transition temperature $T_{c2}$ of approximately 0.1 K, identifying a Cd doping level of approximately 14%, can be used for the switch thermometer T2 as shown in the dilation refrigerator 600. The switch thermometer T2 is shown at the second chamber 626. A third transition temperature $T_{c3}$ of approximately 5 K, identifying a Cd doping level of approximately 12%, can be used for the switch thermometer T3 as shown in the dilation refrigerator 600. The switch thermometer T3 is shown at the third chamber 624. A fourth transition temperature $T_{c4}$ of approximately 1.5 K, identifying a Cd doping level of approximately 10%, can be used for the switch thermometer T4 as shown in the dilation refrigerator 600. The switch thermometer T4 is shown at the bath 612.

Figure 8:
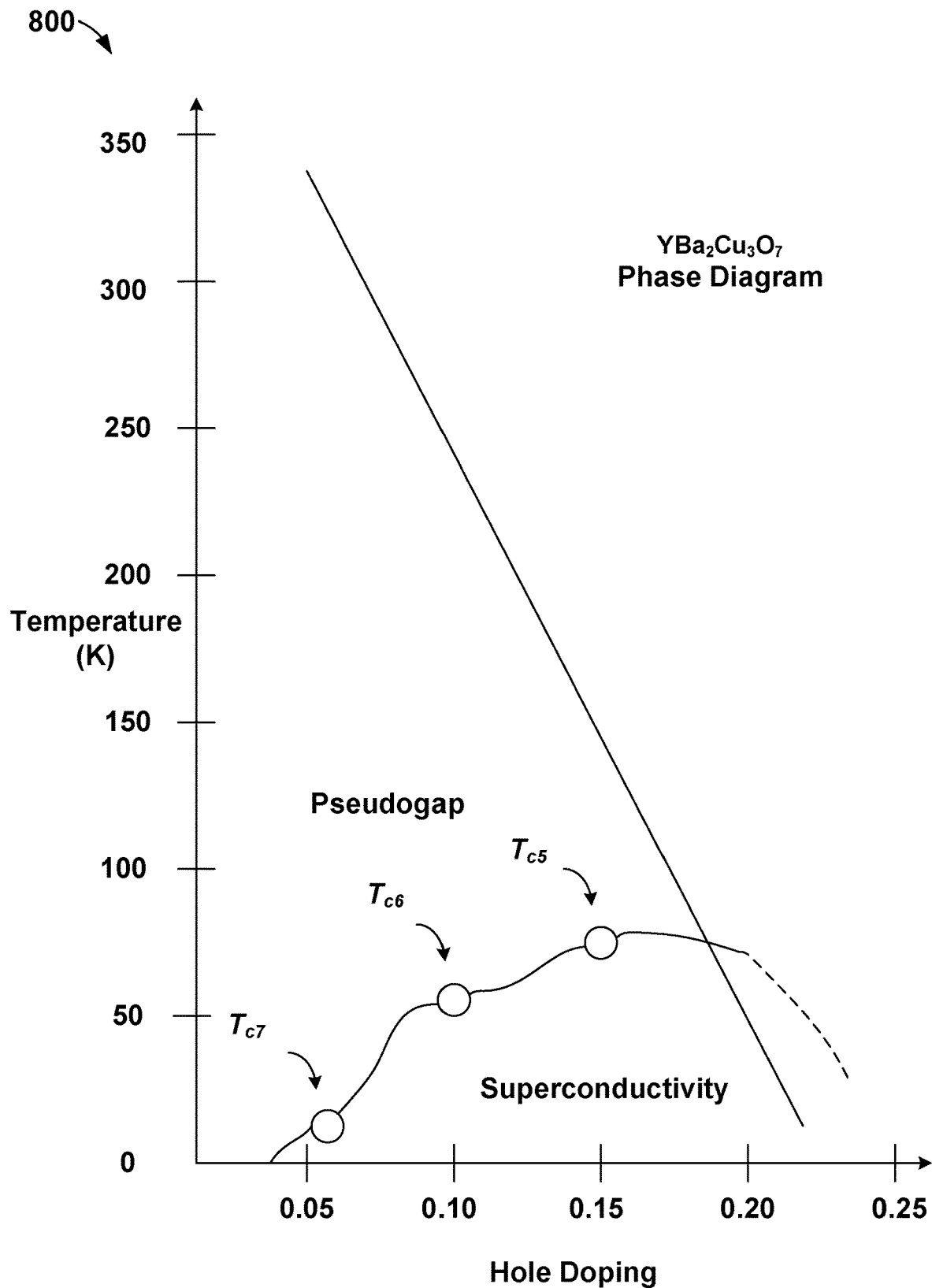
FIG. 8 illustrates a phase diagram for Yttrium barium copper oxide, according to an embodiment.

Referring to FIG. 8, a phase diagram 800 for yttrium barium copper oxide, $YBa_2Cu_3O_7$, is shown, according to an embodiment. The phase diagram 800 for $YBa_2Cu_3O_7$ has hole doping along the horizontal or x-axis, from about 0 to 0.25. An increase in temperature in Kelvin is shown along the vertical or y-axis. The phase diagram 800 for $YBa_2Cu_3O_7$ illustrates a change in $T_c$ as the hole doping changes. Two states are shown, a pseudogap phase and a superconductivity phase. As the hole doping increases, the $T_c$ increases with an increase in temperature, from superconductivity to the normal electronic state or pseudogap phase. The $T_c$ is shown as the transition temperature between superconductivity and normal electronic conduction.

The phase diagram 800 for $YBa_2Cu_3O_{7.5}$ illustrates a fifth transition temperature $T_{c5}$ of approximately 75 K, identifying a hole doping level of approximately 0.15, which can be used for the switch thermometer T5 as shown in the dilation refrigerator 600. The switch thermometer T5 is shown at the first chamber 622. A sixth transition temperature $T_{c6}$ of approximately 60 K, identifying a hole doping level of approximately 0.10 can be used for the switch thermometer T6 as shown in the dilation refrigerator 600. The switch thermometer T6 is shown at the first chamber 622. A seventh transition temperature $T_{c7}$ of approximately 10 K, identifying a hole doping level of approximately 0.06 can be used for the switch thermometer T7 as shown in the dilation refrigerator 600. The switch thermometer T7 is shown at the magnet 618.

The switch 300 may be mass produced at a lower cost when compared with currently used calibrated cryogenic temperature sensors. In an embodiment, an array of the switches 300 may be used for a more effective management of temperatures in different areas of a system, for example, the dilution refrigerator 600. Other potential families of superconductors that are useful for this superconducting switch thermometer array design are the recently discovered iron-based superconductors, or heavy fermion superconductors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of determining that an ambient temperature is below a transition temperature, the method comprising:
    measuring a magnetic field of a magnetic field source, wherein a superconducting film is positioned between a magnetic field sensor and the magnetic field source, wherein the superconducting film comprises a transition temperature, $T_c$;
    based on determining that the measured magnetic field approximately equals an expected magnetic field of the magnetic field source, outputting a first state of a switch, wherein the first state of the switch indicates that the ambient temperature is above the $T_c$; and
    based on determining that the measured magnetic field is less than the expected magnetic field, outputting a second state of the switch, wherein the second state of the switch indicates that the ambient temperature is below the $T_c$.

2. The method according to claim 1, further comprising:
    measuring a second magnetic field of a second magnetic field source, wherein a second superconducting film is positioned between a second magnetic field sensor and the second magnetic field source, wherein the second superconducting film has the transition temperature, $T_{c2}$;
    based on determining that the second measured magnetic field approximately equals a second expected magnetic field of the second magnetic field source, outputting a first state of a second switch, wherein the first state of the second switch indicates the ambient temperature is above the $T_{c2}$; and
    based on determining that the second measured magnetic field is less than the second expected magnetic field, outputting a second state of the second switch, wherein the second state of the second switch indicates the ambient temperature is below the $T_{c2}$.

3. The method according to claim 1, where the superconducting film comprises a superconducting material having transition temperature between approximately 10 mK and 138 K.

4. The method according to claim 1, where an array of switches is located in a cryogenic refrigerator.

5. The method according to claim 1, wherein the superconducting film comprises at least one of the following: $CeCoIn_5$ and $YBa_2Cu_3O_7$, or any other such family of superconducting material where the superconducting transition temperature can be adjusted by altering a physical parameter.

6. A method of determining that an ambient temperature is above or below a transition temperature, the method comprising:
measuring a magnetic field of a magnetic field source, wherein a superconducting film is positioned between a magnetic field sensor and the magnetic field source, wherein the superconducting film comprises a transition temperature, $T_c$; and
based on determining that the measured magnetic field is less than an expected magnetic field of the magnetic field source, outputting a second state of a switch, wherein the second state of the switch indicates that the ambient temperature is below the $T_c$.

7. The method according to claim 6, wherein the superconducting film comprises a superconducting material having transition temperature between approximately 10 mK and 138 K.

8. The method according to claim 6, wherein an array of switches is located in a cryogenic refrigerator.

9. The method according to claim 6, further comprising:
measuring a second magnetic field of a second magnetic field source, wherein a second superconducting film is positioned between a second magnetic field sensor and the second magnetic field source, wherein the second superconducting film has the transition temperature, $T_{c2}$; and
based on determining that the second measured magnetic field is less than a second expected magnetic field of the second magnetic field source, outputting a second state of the second switch, wherein the second state of the second switch indicates that the ambient temperature is below the $T_{c2}$.

10. The method according to claim 9, wherein the superconducting film includes one of the following: $CeCoIn_5$ and $YBa_2Cu_3O_7$.

11. A switch for a low temperature thermometer comprising:
a magnetic field sensor, wherein the magnetic field sensor measures a magnetic field;
a magnetic field source; and
a superconducting film comprising a transition temperature, $T_c$, and positioned between the magnetic field sensor and the magnetic field source,
wherein the switch outputs a first state based on the magnetic field sensor measuring the magnetic field being essentially unaltered by the presence of the superconducting film, wherein the first state indicates that an ambient temperature is above the $T_c$, and
wherein the switch outputs a second state based on the magnetic field sensor measuring the magnetic field being weaker than an expected magnetic field from the magnetic field source, wherein the second state indicates that the ambient temperature is below the $T_c$.

12. The switch according to claim 11, further comprising:
an array of switches, wherein each switch of the array of switches has a corresponding transition temperature, $T_c$.

13. The switch according to claim 11, wherein the superconducting film comprises a superconducting material having a transition temperature between approximately 10 mK and 138 K.

14. The switch according to claim 11, wherein an array of switches is located in a cryogenic refrigerator.

* * * * *